United States Patent
Kazama et al.

(10) Patent No.: US 11,028,893 B2
(45) Date of Patent: Jun. 8, 2021

(54) ELASTIC MEMBER AND WIRE FOR ELASTIC MEMBER

(71) Applicant: NHK Spring Co., Ltd., Yokohama (JP)

(72) Inventors: Toshio Kazama, Kanagawa (JP);
Noritoshi Takamura, Nagano (JP);
Shigeki Ishikawa, Kanagawa (JP);
Takeshi Suzuki, Kanagawa (JP)

(73) Assignee: NHK Spring Co., Ltd., Yokohama (JP)

(*) Notice: Subject to any disclaimer, the term of this patent is extended or adjusted under 35 U.S.C. 154(b) by 0 days.

(21) Appl. No.: 16/779,799

(22) Filed: Feb. 3, 2020

(65) Prior Publication Data
US 2020/0173510 A1  Jun. 4, 2020

Related U.S. Application Data

(63) Continuation of application No. 15/740,634, filed as application No. PCT/JP2016/069142 on Jun. 28, 2016, now Pat. No. 10,591,011.

(30) Foreign Application Priority Data

Jun. 29, 2015 (JP) .............................. JP2015-130303

(51) Int. Cl.
*F16F 1/02* (2006.01)
*F16F 1/14* (2006.01)
(Continued)

(52) U.S. Cl.
CPC .............. *F16F 1/024* (2013.01); *B60G 11/14* (2013.01); *B60G 11/18* (2013.01); *B60G 21/055* (2013.01);
(Continued)

(58) Field of Classification Search
CPC ...... F16F 1/024; F16F 1/06; F16F 1/14; F16F 1/021; C22C 1/0416; C22C 21/00;
(Continued)

(56) References Cited

U.S. PATENT DOCUMENTS

| 4,079,926 A | 3/1978 | Nunes |
| 4,537,808 A | 8/1985 | Yamamoto et al. |
| 10,591,011 B2 * | 3/2020 | Kazama ............... B60G 21/055 |
| 2010/0029145 A1 | 2/2010 | Balsells et al. |
| 2010/0289198 A1 | 11/2010 | Balsells et al. |

FOREIGN PATENT DOCUMENTS

| CN | 101608678 A | 12/2009 |
| CN | 102414470 A | 4/2012 |

(Continued)

OTHER PUBLICATIONS

International Search Report prepared by the Japanese Patent Office, acting as ISA, dated Aug. 9, 2016, in corresponding International Patent Application No. PCT/JP2016/069142.
(Continued)

*Primary Examiner* — Pamela Rodriguez
(74) *Attorney, Agent, or Firm* — Locke Lord LLP

(57) ABSTRACT

An elastic member is an elastic member formed of a wire having a cross section that is substantially circular, the cross section being orthogonal to a longitudinal direction, and the elastic member being expandable and contractible in a predetermined direction; and including: a first alloy portion that is made of an aluminum alloy having a tensile strength larger than 950 MPa and equal to or less than 1100 MPa at room temperature; and a second alloy portion configured to cover the first alloy portion, the second alloy portion having a thickness in a radial direction smaller than a radius of the first alloy portion, and being made of an aluminum alloy having a tensile strength of 100 MPa to 650 MPa at room temperature.

13 Claims, 5 Drawing Sheets

(51) Int. Cl.
  *C22C 21/10* (2006.01)
  *B60G 11/14* (2006.01)
  *C22C 21/06* (2006.01)
  *B60G 21/055* (2006.01)
  *B60G 11/18* (2006.01)
  *C22C 21/00* (2006.01)
  *F16F 1/06* (2006.01)
  *C22C 1/04* (2006.01)

(52) U.S. Cl.
  CPC ........ *B60G 21/0551* (2013.01); *C22C 21/00* (2013.01); *C22C 21/06* (2013.01); *C22C 21/10* (2013.01); *F16F 1/14* (2013.01); *B60G 2202/12* (2013.01); *B60G 2202/134* (2013.01); *B60G 2202/135* (2013.01); *B60G 2204/1222* (2013.01); *B60G 2206/426* (2013.01); *B60G 2206/427* (2013.01); *B60G 2206/7102* (2013.01); *C22C 1/0416* (2013.01); *F16F 1/021* (2013.01); *F16F 1/06* (2013.01)

(58) Field of Classification Search
  CPC ......... C22C 21/10; C22C 21/06; B60G 11/14; B60G 21/055; B60G 21/0551; B60G 11/18; B60G 2202/135; B60G 2202/134; B60G 2202/12; B60G 2204/1222; B60G 2206/427; B60G 2206/7102; B60G 2206/426
  USPC ..... 267/151, 166, 167, 168, 143; 29/896.93, 29/896.9, 896.91
  See application file for complete search history.

(56) References Cited

FOREIGN PATENT DOCUMENTS

| | | |
|---|---|---|
| CN | 203979232 U | 12/2014 |
| CN | 104417468 A | 3/2015 |
| EP | 1464719 A1 | 10/2004 |
| FR | 2788317 A1 | 7/2000 |
| JP | 10-196697 A | 7/1998 |
| JP | 11-230221 A | 8/1999 |
| JP | 2000-328209 A | 11/2000 |
| JP | 2004-353080 A | 12/2004 |
| JP | 2012-525555 A | 10/2012 |
| JP | 2012-248495 A | 12/2012 |
| JP | 5335056 B2 | 11/2013 |
| WO | 2012055489 A1 | 3/2012 |
| WO | 2015/141857 A1 | 9/2015 |

OTHER PUBLICATIONS

Office Action dated Jan. 8, 2019, issued for the corresponding Chinese patent application No. 201680037944.3 and English translation thereof.
European Search Report dated Feb. 13, 2019, issued for the European patent application No. 16817914.1.
Office Action dated Aug. 16, 2019, issued for the corresponding Chinese patent application No. 201680037944.3 and English translation of the cover page and the Search Report.
A page including "(4) Aluminum-zinc alloy", Science of Metallic Materials, Apr. 30, 2014, p. 156 Section 4, and English translation thereof.
Decision of a Patent Grant dated Nov. 19, 2019, issued for the corresponding Japanese patent application No. 2017-526369 and English translation thereof.

\* cited by examiner

ELASTIC MEMBER AND WIRE FOR ELASTIC MEMBER

This application is a Continuation of U.S. patent application Ser. No. 15/740,634 filed on Dec. 28, 2017, issued as U.S. Pat. No. 10,591,011, which is National Stage Entry of PCT Application No. PCT/JP2016/069142, filed on Jun. 28, 2016, which claims priority from Japanese Application No. 2015-130303, filed on Jun. 29, 2015. The entire contents of these applications are incorporated herein by reference in their entirety.

FIELD

The present invention relates to an elastic member for an automobile, and a wire for the elastic member, the wire being used in manufacture of the elastic member.

BACKGROUND

Conventionally, as a method of realizing improvement of fuel efficiency of automobiles, weight reduction of various parts thereof has been pursued. For example, aluminum alloys have started to be used instead of cast iron as a material for engine blocks, and magnesium alloys have started to be used instead of steel as a material for engine covers and oil pans.

In recent years, in terms of weight reduction of automobiles, use of a material made of an aluminum alloy in an elastic member of, for example, a suspension or the like, has been considered. As such aluminum alloys, 6000 series aluminum alloys have been disclosed (see, for example, Patent Literature 1).

As aluminum alloys higher in strength than the above mentioned 6000 series aluminum alloys, 7000 series aluminum alloys have been known. If a 7000 series aluminum alloy is used, an elastic member higher in strength than a bolt made of a 6000 series aluminum alloy is able to be made.

CITATION LIST

Patent Literature

Patent Literature 1: Japanese Patent No. 5335056

SUMMARY

Technical Problem

However, 7000 series aluminum alloys are generally lower in stress corrosion cracking resistance than 6000 series aluminum alloys, and thus when a 7000 series aluminum alloy is used in an elastic member, its stress corrosion cracking resistance needs to be improved. Under such circumstances, an elastic member made of a material having improved strength and stress corrosion cracking resistance has been demanded.

The present invention has been made in view of the above, and an object thereof is to provide an elastic member having improved strength and stress corrosion cracking resistance, and a wire for the elastic member, the wire being used in manufacture of the elastic member.

Solution to Problem

To solve the above-described problem and achieve the object, an elastic member according to the present invention is formed of a wire having a substantially circular cross section orthogonal to a longitudinal direction, expandable and contractible in a predetermined direction and includes: a first alloy portion made of an aluminum alloy having a tensile strength larger than 950 MPa and equal to or less than 1100 MPa at room temperature; and a second alloy portion configured to cover the first alloy portion, the second alloy portion having a thickness in a radial direction smaller than a radius of the first alloy portion, and being made of an aluminum alloy having a tensile strength of 100 MPa to 650 MPa at room temperature.

Moreover, in the elastic member according to the present invention, the second alloy portion is formed of aluminum alloys being layered over one another, the aluminum alloys having different compositions from one another.

Moreover, in the elastic member according to the present invention, a radially outermost layer of the second alloy portion is smallest in tensile strength.

Moreover, in the elastic member according to the present invention, a radially outermost layer of the second alloy portion is smallest in thickness.

Moreover, in the elastic member according to the present invention, a ratio of the thickness of the second alloy portion to the radius of the first alloy portion is 0.01 to 0.2.

Moreover, a wire for an elastic member according to the present invention is a wire having a cross section that is substantially circular, the cross section being orthogonal to a longitudinal direction, and includes: a core portion made of an aluminum alloy having a tensile strength larger than 950 MPa and equal to or less than 1100 MPa at room temperature; and an outer peripheral portion configured to cover the core portion, the outer peripheral portion having a thickness in a radial direction smaller than a radius of the core portion, and being made of an aluminum alloy having a tensile strength of 100 MPa to 650 MPa at room temperature.

Moreover, in the above-described wire for the elastic member according to the present invention, a ratio of the thickness of the outer peripheral portion to the radius of the core portion is 0.01 to 0.2.

Advantageous Effects of Invention

The present invention provides an effect that an elastic member having improved strength and stress corrosion cracking resistance, and a wire for the elastic member, the wire being used in manufacture of the elastic member, are able to be obtained.

DESCRIPTION OF EMBODIMENTS

Hereinafter, with reference to the appended drawings, a mode for carrying out the present invention (hereinafter, referred to as "embodiment") will be described. The drawings are schematic, a relation between a thickness and a width of each portion and ratios among thicknesses of respective portions may be different from the actual relation and ratios, and the drawings may also include a portion that differs in relations or ratios among its dimensions mutually among the drawings.

Embodiment

Figure 1:
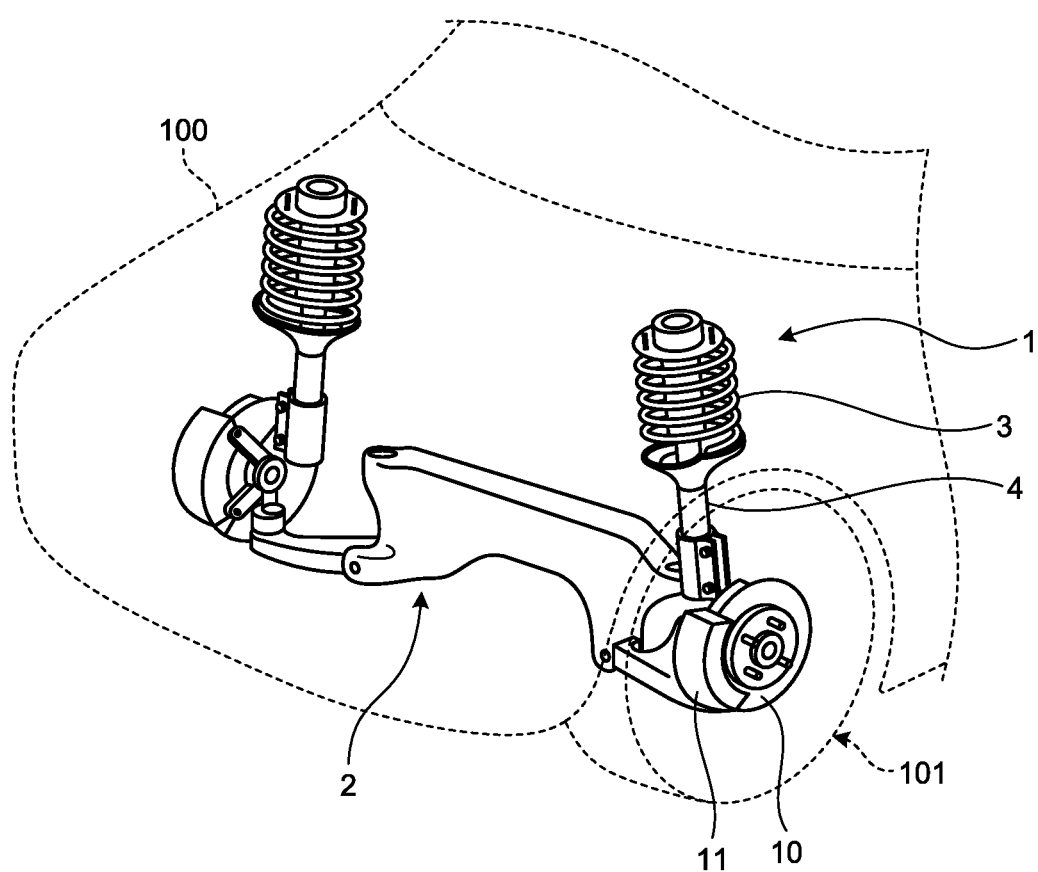
FIG. 1 is a perspective view schematically illustrating a configuration of a suspension according to an embodiment of the present invention.

FIG. 1 is a perspective view schematically illustrating a configuration of a suspension according to an embodiment of the present invention. A suspension 1 illustrated in FIG. 1 includes: an arm portion 2 that forms a framework of the suspension 1, and rotatably supports two disc rotors 10, to which tires 101 are attached; coil springs 3 (elastic members) that are expandable and contractible in a direction substantially perpendicular to a direction in which the two disc rotors 10 face each other; and shock absorbers 4 that attenuate force (vibration) exerted on expansion and contraction operation of the coil springs 3. The disc rotors 10 are each provided with a caliper 11 that is able to decelerate rotation speed of the disc rotor 10 by applying load to the disc rotor 10 in a direction orthogonal to a rotation direction of the disc rotor 10, with the disc rotor 10 inserted in the caliper 11. The suspension 1 is installed in a vehicle body 100, and absorbs vibration transmitted from the tires 101 according to irregularities on road surfaces.

Figure 2:
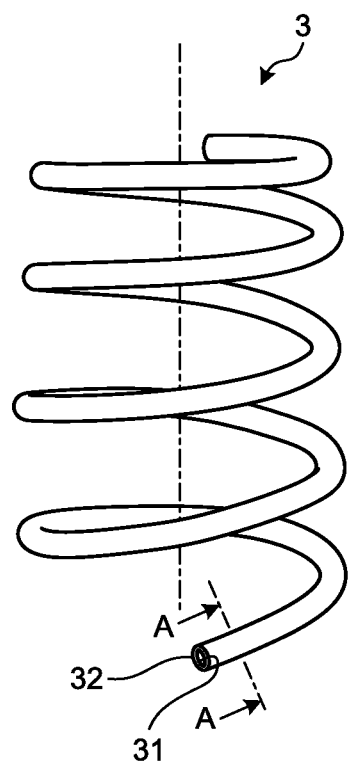
FIG. 2 is a perspective view schematically illustrating a configuration of main parts of the suspension according to the embodiment of the present invention.

FIG. 2 is a perspective view schematically illustrating a configuration of main parts of the suspension according to the embodiment of the present invention, and is a perspective view illustrating a configuration of the coil spring 3. The coil spring 3 illustrated in FIG. 2 is made of a clad material formed by joining of two types of aluminum (Al) alloys different from each other. The coil spring 3 is made by a wire being spirally wound around, the wire being made of the above mentioned clad material and having a cross section that is substantially circular, the cross section being cut along a plane orthogonal to a longitudinal direction thereof. The coil spring 3 is expandable and contractible in a predetermined direction (for example, a direction in which the coil spring 3 is stretched by being wound around). In this specification, an aluminum alloy refers to an alloy having aluminum as a main component thereof.

The coil spring 3 has a first alloy portion 31 and a second alloy portion 32 that are respectively formed by use of two types of aluminum alloys different from each other. The first alloy portion 31 forms a portion at a radially inner side of the coil spring 3, and serves as a core portion of the coil spring 3. The second alloy portion 32 forms a portion at a radially outer side of the coil spring 3. That is, the second alloy portion 32 forms a surface layer portion of the coil spring 3.

The first alloy portion 31 is made of an aluminum alloy containing: more than 10.0 wt % and equal to or less than 17.0 wt % of zinc (Zn); and more than 2.0 wt % and equal to or less than 6.0 wt % of magnesium (Mg), with the remainder containing Al and unavoidable impurities. The first alloy portion 31 more preferably contains at least one or more types selected from a group consisting of: 0.1 wt % or more and 3.0 wt % or less of copper (Cu); 0.05 wt % or more and 0.4 wt % or less of zirconium (Zr); 0.1 wt % or more and 2.0 wt % or less of manganese (Mn); 0.05 wt % or more and 0.5 wt % or less of iron (Fe); 0.1 wt % or more and 0.6 wt % or less of chromium (Cr); 0.05 wt % or more and 0.4 wt % or less of silicon (Si); 0.01 wt % or more and 0.1 wt % or less of vanadium (V); 0.01 wt % or more and 0.2 wt % or less of titanium (Ti); 0.1 wt % or more and 2.0 wt % or less of nickel (Ni); and 0.01 wt % or more and 0.6 wt % or less of silver (Ag). The first alloy portion 31 has a tensile strength larger than 950 MPa and equal to or less than 1100 MPa, at room temperature. A tensile strength has a value (for example in MPa) indicating a strength of a material. "Room temperature" referred to herein means temperature that is in a range of, for example, 15° C. to 25° C., and that is constant at the time of measurement. The above mentioned tensile strength is obtained because concentrations of Zn and Mg are high, and, in this case, because of occurrence of precipitation hardening due to a precipitate mainly composed of Zn and Mg.

Of the metals composing the first alloy portion 31, Zn provides a property of making the tensile strength high, and improving extrusion for when a later described wire for the elastic member (a wire 300 for the elastic member) is manufactured by an extrusion method. Mg provides a property of making the tensile strength high. Cu provides a property of making the tensile strength high, and improving stress corrosion cracking resistance. Zr provides a property of improving toughness, heat resistance, and the stress corrosion cracking resistance. Mn provides a property of making the tensile strength high, and improving the toughness, the heat resistance, and the stress corrosion cracking resistance. Further, Fe provides a property of improving the heat resistance. Cr provides a property of improving the toughness, the heat resistance, and the stress corrosion cracking resistance. Ti and Ni provide a property of improving the heat resistance. Ag provides a property of making the tensile strength high, and improving the stress corrosion cracking resistance.

The second alloy portion 32 is made of an aluminum alloy containing 0.005 wt % or more and 6.5 wt % Zn or less of Zn, with the remainder containing Al and unavoidable impurities. The second alloy portion 32 has a tensile strength equal to or larger than 100 MPa and equal to or less than 650 MPa, preferably equal to or larger than 350 MPa and equal to or less than 650 MPa, at room temperature. A radius of an outer circumference of the second alloy portion 32, that is, a radius of the wire of the coil spring 3 for the suspension 1 is, for example, equal to or larger than 8 mm and equal to or less than 15 mm.

The second alloy portion 32 preferably contains at least one or more types selected from a group consisting of: 0.05 wt % or more and 2.0 wt % or less of Mg; 0.1 wt % or more and 1.1 wt % or less of Cu; 0.01 wt % or more and 0.25 wt % or less of Zr; 0.051 wt % or more and 1.0 wt % or less of Mn; 0.05 wt % or more and 0.5 wt % or less of Fe; 0.05 wt % or more and 0.3 wt % or less of Cr; 0.05 wt % or more and 1.3 wt % or less of Si; 0.01 wt % or more and 0.1 wt % or less of V; 0.01 wt % or more and 0.2 wt % or less of Ti; 0.1 wt % or more and 2.0 wt % or less of Ni; and 0.01 wt % or more and 0.6 wt % or less of Ag. Examples of an aluminum alloy having such a composition include 6000 series aluminum alloys, for example, A6056. A6056 is an alloy having Al—Mg—Si as main elements, and is known as an aluminum alloy having a comparatively high tensile strength and having improved stress corrosion cracking resistance.

A coating may be additionally formed around the second alloy portion 32. The coating in this case is formed by use of a material made of, for example, anodized aluminum, and forms a layer having a thickness of about 1/100 of the radius of the outer circumference of the second alloy portion 32. For example, if the dimeter of the outer circumference of the second alloy portion 32 is 10 mm, the thickness of this coating is about 0.1 mm. By the formation of this coating, antirust effect is able to be improved.

Figure 3:
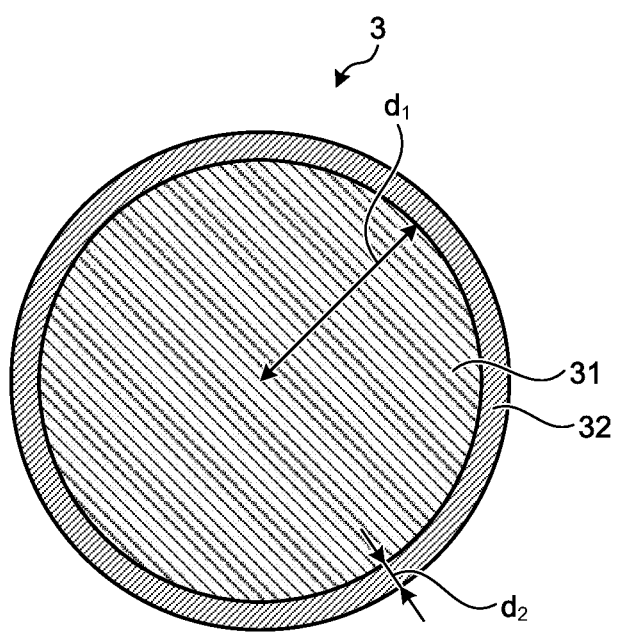
FIG. 3 is a sectional view along a line A-A illustrated in FIG. 2.

FIG. 3 is a sectional view along a line A-A illustrated in FIG. 2. A cross section illustrated in FIG. 3 is a cross section cut along the plane orthogonal to the longitudinal direction of the wire. As illustrated in FIG. 3, when a radius of the first alloy portion 31 is $d_1$, and a thickness of the second alloy portion 32 in a radial direction thereof is $d_2$; a relation, "$d_2<d_1$", is satisfied. More preferably, the radius of the coil spring 3, that is, the radius $(d_1+d_2)$ of the outer circumference of the second alloy portion 32, and the thickness $d_2$ satisfy a relation, "$0.01 \le d_2/(d_1+d_2) \le 0.2$". Even more preferably, the radius $(d_1+d_2)$ of the outer circumference of the second alloy portion 32 and the thickness $d_2$ satisfy a relation, "$0.05 \le d_2/(d_1+d_2) \le 0.15$".

Figure 4:
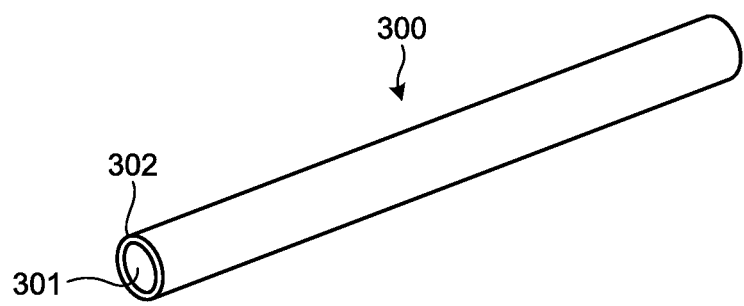
FIG. 4 is a perspective view illustrating a configuration of a wire for the elastic member according to the embodiment of the present invention.

FIG. 4 is a perspective view illustrating a configuration of a wire for the elastic member, the wire being a wire for manufacture of the coil spring 3. The wire 300 for the elastic member illustrated in this figure (hereinafter, simply referred to as "wire 300") forms a columnar shape having a two-layer structure including: a core portion 301 that is made of the same aluminum alloy as the first alloy portion 31 and that is columnar; and an outer peripheral portion 302 that covers around the core portion 301 and that is made of the same aluminum alloy as the second alloy portion 32. The wire 300 is manufactured by, for example, an extrusion method. Similarly to the above described first alloy portion 31 and second alloy portion 32, a ratio of a thickness of the outer peripheral portion 302 to a radius of the core portion 301, in the wire 300, is equal to or larger than 0.01 and equal to or less than 0.2. By this wire 300 being wound around, the above described coil spring 3 is able to be manufactured.

According to the above described embodiment of the present invention, by formation of the two layer structure including: the first alloy portion 31 that is made of the high strength aluminum alloy serving as the core portion providing springiness of the coil spring 3 and that has the tensile strength larger than 950 MPa and equal to or less than 1100 MPa at room temperature; and the second alloy portion 32 that forms the outer surface, that is made of the aluminum alloy having improved stress corrosion cracking resistance, and that has the tensile strength equal to or larger than 100 MPa and equal to or less than 650 MPa at room temperature; an elastic member having improved strength and stress corrosion cracking resistance is able to be provided.

Further, according to this embodiment, since the radius $(d_1+d_2)$ of the outer circumference of the second alloy portion 32 and the thickness $d_2$ satisfy the relation, "$0.01 \le d_2/(d_1+d_2) \le 0.2$", strength of the coil spring 3 is able to be improved, while both this strength and improved stress corrosion cracking resistance are able to be achieved.

Further, according to this embodiment, by formation of the wire 300 for the elastic member, the wire 300 being the clad material including: the core portion 301 that serves as the core portion providing the springiness of the coil spring 3 and that is made of the high strength aluminum alloy; and the outer peripheral portion 302 that forms the outer surface and that is made of the aluminum alloy having improved stress corrosion cracking resistance; an elastic member (coil spring 3) having improved strength and stress corrosion cracking resistance is able to be formed by a manufacturing method similar to a conventional manufacturing method.

Further, according to this embodiment, since the radius $(d_1+d_2)$ of the outer circumference of the outer peripheral portion 302 and the thickness $(d_2)$ of the outer peripheral portion 302 satisfy the relation, "$0.01 \le d_2/(d_1+d_2) \le 0.2$", strength and stress corrosion cracking resistance of the elastic member that has been formed are able to be achieved with appropriate balance therebetween.

(Modified Example of Embodiment)

Figure 5:
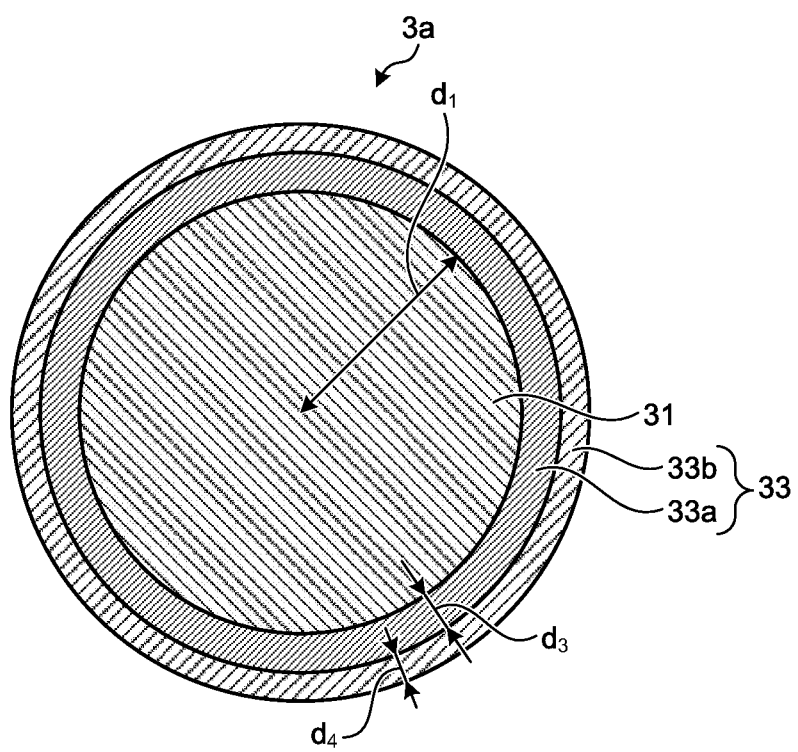
FIG. 5 is a sectional view schematically illustrating a configuration of main parts of a suspension according to a modified example of the embodiment of the present invention.

FIG. 5 is a sectional view schematically illustrating a configuration of main parts of a suspension according to a modified example of the embodiment of the present invention. FIG. 5 is a sectional view of a coil spring 3a according to this modified example, and is a sectional view corresponding to the line A-A in FIG. 2. In the above described embodiment, an alloy portion (second alloy portion 32) made of an aluminum alloy having improved stress corrosion cracking resistance has been described as being provided in one layer on an outer peripheral side of the first alloy portion 31, but the second alloy portion may be formed of two or more layers. In this modified example, an example, in which a second alloy portion made of an aluminum alloy having improved stress corrosion cracking resistance is in two layers, will be described.

The coil spring 3a illustrated in FIG. 5 is made of a clad material formed by joining of three types of aluminum alloys different from one another. The coil spring 3a is made by a wire being spirally wound around, the wire being made of the above described clad material and having a cross section that is substantially circular, the cross section being cut along a plane orthogonal to a longitudinal direction thereof. The cross section may have a linearly symmetric shape, such as an elliptical shape, instead of the above described substantially circular shape.

The coil spring 3a is formed of the first alloy portion 31 and a second alloy portion 33 that are respectively formed by use of three types of aluminum alloys having compositions different from one another. The second alloy portion 33 has a first layer 33a provided on the outer peripheral side of the first alloy portion 31, and a second layer 33b that is provided on an outer peripheral side of the first layer 33a and that forms a radially outer portion of the coil spring 3a. That is, the second layer 33b forms a surface layer portion of the coil spring 3a.

The first layer 33a and the second layer 33b are aluminum alloys that: are formed by combination of types of metals that are the same as those of the metals used in the above described second alloy portion 32, in the same composition range; have tensile strengths in the same range as the second alloy portion 32; and have compositions different from each other. Further, the first layer 33a is equivalent to or larger than the second layer 33b in tensile strength. That is, in a case where the tensile strengths of the first layer 33a and the second layer 33b are different from each other, tensile strength of the coil spring 3a decreases in order from the first alloy portion 31, to the first layer 33a, and then to the second layer 33b.

As illustrated in FIG. 5, when a radius of the first alloy portion 31 is $d_1$, a thickness of the first layer 33a of the second alloy portion 33 in a radial direction thereof is $d_3$, and a thickness of the second layer 33b thereof in the radial direction is $d_4$; a relation, "$d_4 \leq d_3 < d_1$", is satisfied. More preferably, a radius of the coil spring $3a$, that is, a radius $(d_1+d_3+d_4)$ of an outer circumference of the second alloy portion 33, and a thickness $(d_3+d_4)$ of the second alloy portion 33 satisfy a relation, "$0.01 \leq (d_3+d_4)/(d_1+d_3+d_4) \leq 0.2$". Even more preferably, the radius $(d_1+d_3+d_4)$ of the outer circumference of the second alloy portion 33 and the thickness $(d_3+d_4)$ satisfy a relation, "$0.05 \leq (d_3+d_4)/(d_1+d_3+d_4) \leq 0.15$".

According to this modified example, by adopting a three-layer structure including: the first alloy portion 31 that serves as the core portion providing the springiness of the coil spring $3a$ and that is made of a high strength aluminum alloy; and the second alloy portion 33 that has the two-layer structure made of aluminum alloys having improved stress corrosion cracking resistance; an elastic member having improved strength and stress corrosion cracking resistance is able to be provided.

Further, according to this modified example, since the radius $(d_1+d_3+d_4)$ of the outer circumference of the second alloy portion 33 and the thickness $(d_3+d_4)$ of the second alloy portion 33 satisfy the relation, "$0.01 \leq (d_3+d_4)/(d_1+d_3+d_4) \leq 0.2$", strength of the coil spring $3a$ is able to be improved, while both this strength and improved stress corrosion cracking resistance are able to be achieved.

In this modified example, in a case where the second alloy portion has three layers or more, a layer outermost in the radial direction has the smallest thickness, and the smallest tensile strength.

Thus far, modes for carrying out the present invention have been described, but the present invention is not to be limited only to the above described embodiment. For example, the elastic member according to the present invention maybe realized as another automobile part.

Figure 6:
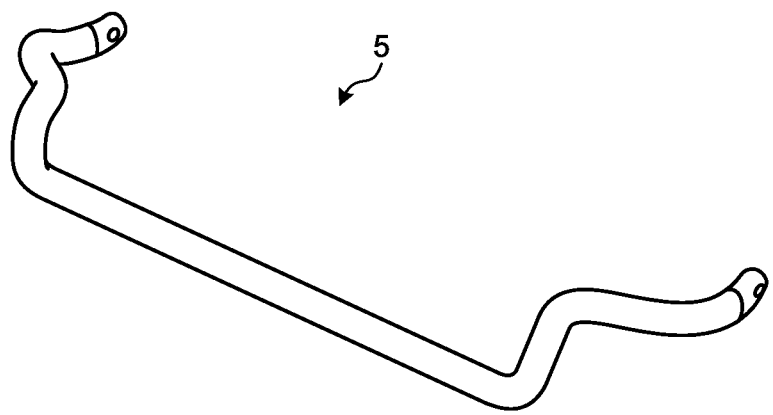
FIG. 6 is a perspective view schematically illustrating an example of a part, in which the wire for the elastic member according to the embodiment of the present invention is used.

FIG. 6 is a perspective view schematically illustrating an example of a part, in which the wire for the elastic member according to the embodiment of the present invention is used. In the embodiment, the coil spring 3 for a suspension has been described as an example, but for example, a stabilizer 5 illustrated in FIG. 6 may be an example. The stabilizer 5 is able to be manufactured by the above described wire 300 being bent. The stabilizer 5 is bent while expanding and contracting according to load applied thereon (direction in which the load is applied). A radius of the outer circumference of the second alloy portion 32 in the stabilizer 5, that is, a dimeter of a wire of the stabilizer 5 is, for example, equal to or larger than 20 mm and equal to or less than 30 mm.

Figure 7:
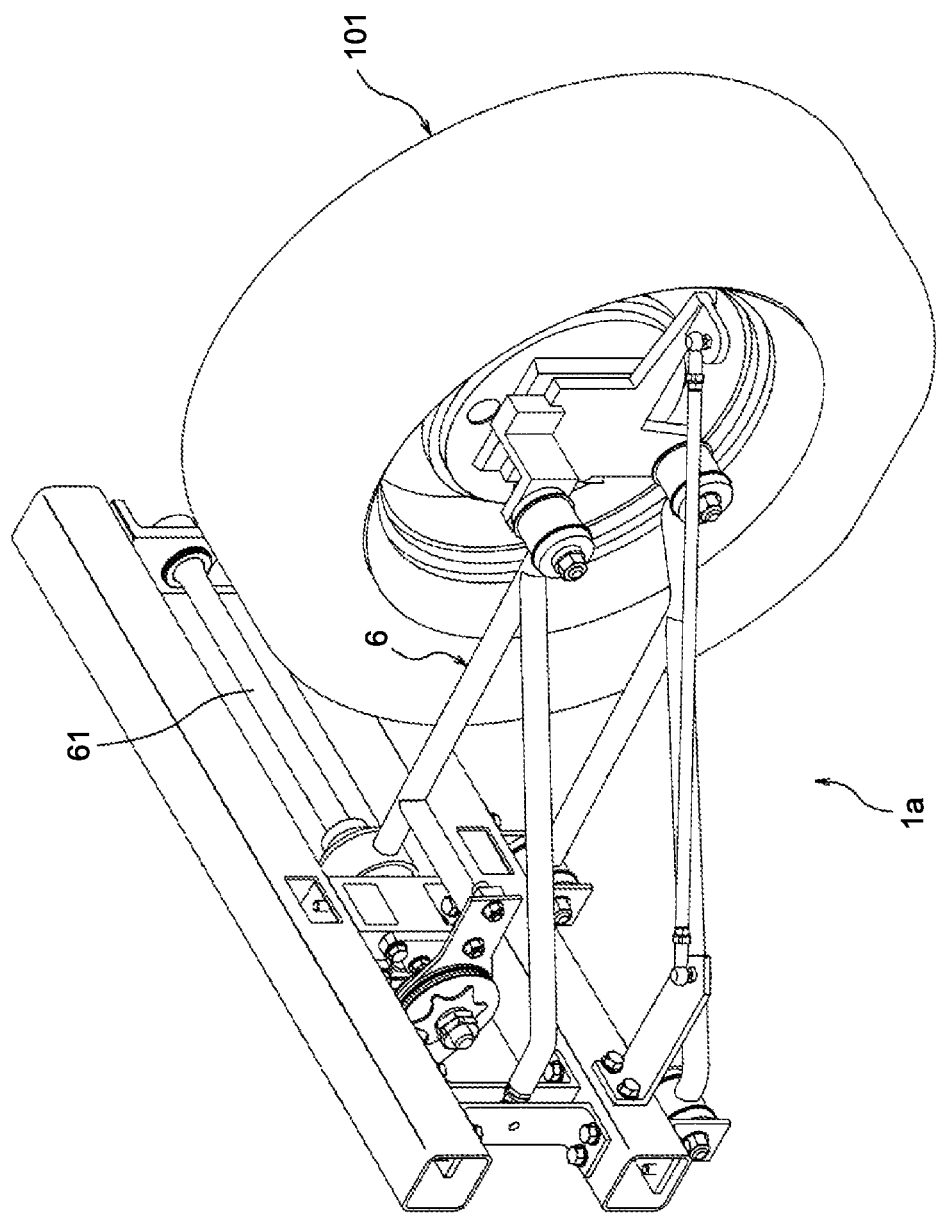
FIG. 7 is a perspective view schematically illustrating an example of a part, in which the wire for the elastic member according to the embodiment of the present invention is used.

FIG. 7 is a perspective view schematically illustrating an example of a part, in which the wire for the elastic member according to the embodiment of the present invention is used. FIG. 7 is an example of a structure of a suspension of a vehicle. A torsion bar 61 is torsionally deformed by receiving rotating force of a trailing link 6 of a suspension $1a$ illustrated in FIG. 7. Quality of a material of this torsion bar 61 may be realized by use of the above described wire for the elastic member. In addition, a door impact beam for an automobile may be manufactured by the wire 300 being bent.

Further, in the present invention, a layer made of an aluminum alloy having improved stress corrosion cracking resistance may be additionally provided on a surface of the second alloy portion 32 or 33. For example, a 2000 series, 3000 series, 4000 series, or 5000 series aluminum alloy is an example of such an aluminum alloy.

Accordingly, the present invention may include various embodiments and the like not described herein, and various design changes and the like within the scope of the technical ideas specified by the scope of the claims may be made.

INDUSTRIAL APPLICABILITY

As described above, an elastic member, and a wire for the elastic member, the wire being used in manufacture of the elastic member, according to the present invention, are useful in formation of an elastic member having improved strength and stress corrosion cracking resistance.

REFERENCE SIGNS LIST

1 SUSPENSION
2 ARM PORTION
3, 3a COIL SPRING
4 SHOCK ABSORBER
5 STABILIZER
10 DISC ROTOR
11 CALIPER
31 FIRST ALLOY PORTION
32, 33 SECOND ALLOY PORTION
33a FIRST LAYER
33b SECOND LAYER
100 VEHICLE BODY
101 TIRE
30

The invention claimed is:

1. An elastic member formed of a wire having a substantially circular cross section orthogonal to a longitudinal direction, the elastic member being expandable and contractible in a predetermined direction and comprising:
a first alloy portion made of an aluminum alloy having a tensile strength larger than 950 MPa and equal to or less than 1100 MPa at room temperature; and
a second alloy portion configured to cover the first alloy portion, the second alloy portion having a thickness in a radial direction smaller than a radius of the first alloy portion, and being made of an aluminum alloy having a tensile strength of 100 MPa to 650 MPa at room temperature,
wherein the first alloy portion is made of an aluminum alloy containing: more than 10.0 wt % and equal to or less than 17.0 wt % of zinc; and more than 2.0 wt % and equal to or less than 6.0 wt % of magnesium, with the remainder containing aluminum and unavoidable impurities.

2. The elastic member according to claim 1, wherein the first alloy portion contains at least one or more types selected from a group consisting of: 0.1 wt % or more and 3.0 wt % or less of copper; 0.05 wt % or more and 0.4 wt % or less of zirconium; 0.1 wt % or more and 2.0 wt % or less of manganese; 0.05 wt % or more and 0.5 wt % or less of iron; 0.1 wt % or more and 0.6 wt % or less of chromium; 0.05 wt % or more and 0.4 wt % or less of silicon; 0.01 wt % or more and 0.1 wt % or less of vanadium; 0.01 wt % or more and 0.2 wt % or less of titanium; 0.1 wt % or more and 2.0 wt % or less of nickel; and 0.01 wt % or more and 0.6 wt % or less of silver.

3. The elastic member according to claim 2, wherein the second alloy portion is made of an aluminum alloy containing 0.005 wt % or more and 6.5 wt % or less of zinc, with the remainder containing aluminum and unavoidable impurities.

4. The elastic member according to claim 3, wherein the second alloy portion contains at least one or more types selected from a group consisting of: 0.05 wt % or more and 2.0 wt % or less of magnesium; 0.1 wt % or more and 1.1 wt % or less of copper; 0.01 wt % or more and 0.25 wt % or less of zirconium; 0.051 wt % or more and 1.0 wt % or less of manganese; 0.05 wt % or more and 0.5 wt % or less of iron; 0.05 wt % or more and 0.3 wt % or less of chromium; 0.05 wt % or more and 1.3 wt % or less of silicon; 0.01 wt % or more and 0.1 wt % or less of vanadium; 0.01 wt % or more and 0.2 wt % or less of titanium; 0.1 wt % or more and 2.0 wt % or less of nickel; and 0.01 wt % or more and 0.6 wt % or less of silver.

5. The elastic member according to claim 1, wherein the second alloy portion is made of an aluminum alloy containing 0.005 wt % or more and 6.5 wt % Zn or less of zinc, with the remainder containing aluminum and unavoidable impurities.

6. The elastic member according to claim 5, wherein the second alloy portion contains at least one or more types selected from a group consisting of: 0.05 wt % or more and 2.0 wt % or less of magnesium; 0.1 wt % or more and 1.1 wt % or less of copper; 0.01 wt % or more and 0.25 wt % or less of zirconium; 0.051 wt % or more and 1.0 wt % or less of manganese; 0.05 wt % or more and 0.5 wt % or less of iron; 0.05 wt % or more and 0.3 wt % or less of chromium; 0.05 wt % or more and 1.3 wt % or less of silicon; 0.01 wt % or more and 0.1 wt % or less of vanadium; 0.01 wt % or more and 0.2 wt % or less of titanium; 0.1 wt % or more and 2.0 wt % or less of nickel; and 0.01 wt % or more and 0.6 wt % or less of silver.

7. The elastic member according to claim 1, wherein the second alloy portion is formed of aluminum alloys being layered over one another, the aluminum alloys having different compositions from one another.

8. The elastic member according to claim 7, wherein a radially outermost layer of the second alloy portion is smallest in tensile strength.

9. The elastic member according to claim 8, wherein a radially outermost layer of the second alloy portion is smallest in thickness.

10. The elastic member according to claim 7, wherein a radially outermost layer of the second alloy portion is smallest in thickness.

11. The elastic member according to claim 1, wherein a ratio of the thickness of the second alloy portion to the radius of the first alloy portion is 0.01 to 0.2.

12. A wire for an elastic member, the wire having a cross section that is substantially circular, the cross section being orthogonal to a longitudinal direction, the wire comprising:
   a core portion made of an aluminum alloy having a tensile strength larger than 950 MPa and equal to or less than 1100 MPa at room temperature; and
   an outer peripheral portion configured to cover the core portion, the outer peripheral portion having a thickness in a radial direction smaller than a radius of the core portion, and being made of an aluminum alloy having a tensile strength of 100 MPa to 650 MPa at room temperature,
   wherein the core portion is made of an aluminum alloy containing: more than 10.0 wt % and equal to or less than 17.0 wt % of zinc; and more than 2.0 wt % and equal to or less than 6.0 wt % of magnesium, with the remainder containing aluminum and unavoidable impurities.

13. The wire for the elastic member according to claim 12, wherein a ratio of the thickness of the outer peripheral portion to the radius of the core portion is 0.01 to 0.2.

* * * * *